United States Patent [19]

Mondt et al.

[11] 4,089,999
[45] May 16, 1978

[54] IMPREGNATION AND PRIMER COATING OF ABSORPTIVE SUBSTRATES WITH PLASTICS DISPERSIONS

[75] Inventors: Josef Mondt, Konigstein, Taunus; Karl Josef Rauterkus, Kelkheim, Taunus; Heinz Lehmann, Kriftel, Taunus; Werner Stelzel, Bad Soden am Taunus; Hans Vitzthum, Frankfurt am Main, all of Germany

[73] Assignee: Hoechst Aktiengesellschaft, Frankfurt am Main, Germany

[21] Appl. No.: 705,447

[22] Filed: Jul. 15, 1976

[30] Foreign Application Priority Data

Jul. 17, 1975 Germany .................... 2531895

[51] Int. Cl.$^2$ ............... B05D 7/26; B32B 3/26
[52] U.S. Cl. ............... 427/385 R; 260/29.6 T; 260/29.6 TA; 260/29.6 H; 260/29.6 PT; 260/29.6 PM; 427/385 C; 427/390 R; 427/407 R; 427/412; 428/304
[58] Field of Search ......... 427/385 R, 388 C, 385 C, 427/304, 422; 260/29.6 PM, 29.6 PT, 29.6 H, 29.6 T, 29.6 TA

[56] References Cited

U.S. PATENT DOCUMENTS

| 3,238,056 | 3/1966 | Pall et al. ............... 427/244 X |
| 3,265,124 | 8/1966 | Reys ............... 428/422 X |
| 3,432,339 | 3/1969 | Howell et al. ............... 427/388 C |

OTHER PUBLICATIONS

Lontz et al., "Teflon . . . Dispersion", *Ind. & Eng. Chem.*, vol. 44, No. 8, pp. 1800–1805 (1952).

*Primary Examiner*—Harry J. Gwinnell
*Attorney, Agent, or Firm*—Curtis, Morris & Safford

[57] ABSTRACT

Absorptive substrates, such as asbestos cement, concrete plaster work, can be impregnated to lock the pores and to consolidate the substrate, especially old and weathered plaster work, with aqueous plastics dispersions, if dispersions are used which have an average particle size of about 0.02 to at most 0.1 μm, and preferably from 0.036 to 0.080 μm. As opposed to conventional dispersions with larger particle sizes, the penetration of dispersions according to the invention reaches the same values as that of the solvent-based impregnating and priming compositions hitherto used. Aqueous dispersions are easier to handle and permit relatively high solids contents at a moderate viscosity.

1 Claim, No Drawings

IMPREGNATION AND PRIMER COATING OF ABSORPTIVE SUBSTRATES WITH PLASTICS DISPERSIONS

Primer coatings for preparing absorptive substrates to be painted have to meet a series of requirements which could be fulfilled hitherto only with solvent-containing systems. The primer coating is assigned to reduce the absorptive capacity of the substrate and optionally to consolidate the substrate, for example in the case of sanding plaster-work, and the primer coating must modify the substrate in such a way that the subsequently applied paint adheres satisfactorily. Especially for consolidating the substrate the primer coat has to penetrate thoroughly.

Solutions of polymers in esters, ketones, aromatic hydrocarbons or gasoline hydrocarbons, e.g. mineral spirit, meet these requirements. However, the use of organic solvents especially in closed rooms is highly disadvantageous. The complete evaporation of the last bit of the solvent may take a relatively long time, and thus the application of the paint has to be postponed for quite a while. Moreover, polymers having a high molecular weight can be satisfactorily used only at a relatively high degree of dilution, since concentrated solutions are too viscous.

Various reasons have so far prevented the solvent-containing systems from being replaced by aqueous systems despite the inconveniences inherent in the solvent-containing systems and in spite of the fact that the aqueous systems were introduced to painting technology quite a while ago. Water-soluble binders may be prepared in such a way, that they penetrate sufficiently well. However, they do not lose their sensitivity to water, or they are not stable against saponification, so that they are inappropriate for application on an alkaline substrate such as plastered surfaces, concrete or masonry.

If the monomers are chosen carefully, plastics deposited from the polymer dispersions are to a large extent water-resistant and stable against saponification. However, the dispersions which have been utilized hitherto for priming substrates for painting techniques do scarcely penetrate into porous substrates. Therefore, they cannot consolidate the same nor do they form a sufficiently adhesive substrate for the subsequently applied paint, especially on worn-out plastered surfaces or on weatherbeaten paint coatings.

Surprisingly, it has now been found that absorptive substrates may be impregnated and primer-coated with plastics dispersions and that this processing step produces impregnations and primer-coatings of excellent penetration, provided that plastics dispersions are utilized which have an average particle diameter of approximately 0.02 to maximum 0.1 $\mu$-meter, most usefully the diameter ranges from 0.02 to 0.06 $\mu$-meter. While the process is being carried out, the dispersions should contain from about 5 to 25 weight % of solid matter, preferably from about 10 to 20 weight %.

This type of plastics dispersion when used for impregnation and primer-coating of porous absorptive substrates such as concrete, masonry, plastered surfaces or wood produces the same desirable results in respect to its penetrating capacity and to the consolidation of the substrate, as are obtained with solutions of polymers in organic solvents. Additionally, the aqueous dispersions provide all the advantages known for aqueous systems.

Suitable monomers for the preparation of polymers to be used in the plastics dispersions according to the invention are olefinically unsaturated compounds which are also employed for the preparation of conventional paint dispersions, such as:

Vinyl chloride, vinylidene chloride, ethylene, esters of acrylic acid or methacrylic acid with alcohols having from 1 to 8 carbon atoms, such as ethyl acrylate, n-butyl acrylate, isobutyl acrylate, 2-ethylhexyl acrylate, methyl methacrylate, and butyl methacrylate; vinyl esters such as vinyl acetate, vinyl propionate, vinyl isobutyrate, vinyl esters of 2-ethyl-hexanoic acid, of isononanoic acid as well as of branched aliphatic carboxylic acids having 10 carbon atoms.

Monovinyl aromatic compounds such as styrene and vinyl toluene.

Unsaturated monocarboxylic acids, their amides or nitriles such as acrylic acid, methacrylic acid, acrylamide, methacrylamide and acrylonitrile.

Maleic acid anhydride, maleic acid and/or fumaric acid and monoesters or diesters of these acids.

Preferred monomers are those which yield saponification-resistant homopolymers or copolymers. Furthermore, they have to produce stable dispersions, of course. The quantitative ratios must be selected according to practices well known to every expert in the art in such a way that polymers are formed having minimum film forming temperatures below or within the range of the intended application temperatures and having the desirable degree of flexibility and rigidity. Polymers having a higher degree of rigidity may be employed as well, of course, if film-forming auxiliaries or exterior plasticizers are employed for attaining the necessary minimum film-forming temperature.

In order to make sure that the dispersions according to the invention are sufficiently water-resistant, the amount of hydrophilic groups in the polymer should be kept to a minimum. Especially the content of unsaturated carboxylic acids — calculated on the total quantity of the monomers — should not surpass 5 weight %. Suitable dispersions for utilization according to the invention are, for example, those, the polymer portion of which is composed of the following monomer combinations at the specified weight ratios:

Butyl acrylate/styrene/acrylic or methacrylic acid 40 - 90/55 - 5/0.5 - 5; butyl acrylate/methyl methacrylate/acrylic or methacrylic acid 40 - 90/55 - 5/0.5 - 5; 2-ethylhexyl acrylate/styrene/acrylic acid or methacrylic acid 30 - 80/65 - 15/0.5 - 5; 2-ethylhexyl acrylate/methyl methacrylate/acrylic acid or methacrylic acid 30 - 80/65 - 15/0.5 - 5; butyl acrylate/styrene/acrylic or methacrylic acid/acrylic and/or methacrylamide 40 - 90/55 - 5/0.1 - 4/0.1 - 4; 2-ethylhexyl acrylate/styrene/acrylic and/or methacrylic acid/acryl and/or methacrylamide 30 - 80/65 - 15/0.1 - 4/0.1 - 4; 2-ethylhexyl acrylate/methyl methacrylate/acrylic and/or methacrylic acid and acryl and/or methacrylamide 30 - 80/65 - 15/0.1 - 4/0.1 - 4; butyl acrylate/methyl methacrylate/acrylic and/or methacrylic acid/acryl and/or methacryl amide 40 - 90/55 - 5/0.1 - 3/0.1 - 3; vinyl acetate/vinyl ester of a branched carboxylic acid having 10 carbon atoms 70 - 30/30 - 70; vinyl acetate/isononanoic acid vinyl ester 70 - 30/30 - 70.

Polymerization should be carried out in the presence of an ionic emulsifier, preferably of an anionic emulsifier. Also a non-ionic emulsifier may be used additionally.

Suitable anionic emulsifiers are the compounds usually employed for emulsion polymerization, e.g. alkali salts of sulfuric acid semi-esters of alkyl phenols or alcohols, which alkyl phenols and alcohols may optionally be oxethylated, as well as alkyl sulfonates and aryl sulfonates. Special examples of these anionic emulsifiers are the alkali salts of sulfuric acid semiesters of a nonyl phenol reacted with 4–5 moles of ethylene oxide, sodium lauryl sulfate, sodium lauryl ethoxylate sulfate containing from 2–5 moles of ethylene oxide, sodium dodecyl benzene sulfonate as well as secondary sodium alkane sulfonates having from 8 to 20 carbon atoms in the carbon chain.

The quantity of anionic emulsifier present in the polymerization charge depends on the desired amount of solid matter of the finished dispersion. This quantity may vary from 0.5 to 10 weight % — calculated on the weight of the monomer —, the emulsifier concentration increasing proportionally to the increasing content of solid matter as desired. The dispersions intended for use in the invention are preferably prepared with a solid matter content of from 30 to 45%, the emulsifier quantity ranging from 2 to 8 weight %.

In addition to the necessary anionic emulsifier there may be utilized non-ionic emulsifiers, such as ethoxylated alkyl phenols or fatty alcohols, e.g. nonyl phenols having from 4–30 moles ethylene oxide units.

Suitable initiators are the usual inorganic per-compounds such as ammonium peroxy-disulfate, potassium peroxy-disulfate, sodium perphosphate, and organic peroxides such as benzoyl-peroxide, organic peresters such as perisopivalate, also in combination with reducing agents such as sodium disulfite, hydrazine, hydroxyl amine as well as catalytical quantities of accelerators such as salts of iron, cobalt, cerium and vanadium; preference is given to the use of alkali or ammonium peroxy disulfates.

The polymerization temperature is not critical. It may vary from +10° to +100° C, preferably from +30° to +90° C. Depending on the content of anionic emulsifier, it is possible to prepare dispersions containing solid matter in an amount of up to about 60%. Best results are obtained, however, with a content of solid matter of from 30 to about 45%. The polymer particles will be the finer, the lower the content of solid matter is and the higher the concentration of emulsifier. Dispersions which have been prepared for special reasons with a low content of solid matter, may be adjusted to a higher content of solid matter by means of vacuum distillation without running the risk of producing coarser polymer particles.

Depending on the type of monomers used, at the end of the polymerization the dispersions are adjusted to a pH ranging from 7 to 10, preferably from 7.5 to 9, by means of alkali, ammonia or amines, if such pH values favor the storage and shear stability of the dispersions.

Polymerization may be carried out advantageously in such a way that from 30–50% of the water with 20–50% of the anionic emsulsifier and 10–50% of the non-ionic emulsifier are precharged to a polymerization reactor and that a preliminary emulsion is prepared from the monomers, the remaining part of water and the rest of emulsifiers, and that preliminary emulsion is metered over a period of 1–3 hours into the mixture in the reactor that has been heated to 50°–90° C. The reaction batch is stirred. The initiator is preferably added as a 1–5% aqueous solution along with the addition of the emulsion. After addition of the components of the reaction mixture has been completed, the whole batch is stirred for another 1–3 hours at a temperature of from 70°–90° C.

Metering in the monomer emulsion is not an essential requirement for successfully preparing the plastics dispersions having finest particle sizes, for plastics dispersions with finest particle sizes may also be obtained by metering the monomer mixture into a liquor which contains the total quantity of water and the emulsifiers and these plastics dispersions are also suitable for the impregnation and primer coating with penetrative capacity. When utilizing plastics dispersions for primer coating and impregnating, the content of solid matter of the dispersions has an essential influence on the depth of penetration, on the consolidating effect and on the diminution of the absorptive capacity of the treated surfaces.

Diluted dispersions penetrate deeper into the substrate pores than concentrated dispersions. When using concentrated dispersions, only part of the latex particles penetrates into the pores, the others form a film on top of the substrate surface. This is the reason why the absorptive capacity of the substrate is very much reduced if concentrated dispersions are utilized whilst the use of diluted dispersions reduces this absorptive capacity but slightly.

The consolidation effect depends on the nature of the polymer and on the content of polymer per unit of volume of the treated surface. Diluted dispersions penetrate deeply into the substrate, but the content of plastics matter per unit of volume is relatively low. As far as concentrated dispersions are concerned, the part of the polymer which remains on top of the surface after drying, does not contribute to the consolidation of deeper layers.

From these considerations it is evident that the selection of the solids content of the dispersions permits adjustment of the relation between penetrating depth, consolidation and sealing of the surface and adaptation of these factors to the various substrates encountered in practice. Good results are obtained when the dispersions of the invention are utilized for the impregnations and primer coatings at solid matter contents of from 5 to 25 weight %, preferably from 10 to 20 weight %. The process of the invention has the advantage that within a relatively wide concentration range good penetration depth and good consolidation can be obtained due to the presence of a high proportion of specific plastics in the treated surface, if the latex particles have an average particle size within the range of from 0.02 to 0.1 μm, preferably from 0.02 to 0.06 μm.

In accordance with the current practice for dispersion paints, auxiliaries may be added. Of the many known possibilities the following example may be mentioned:

Solvents for improving the formation of films and for lowering the temperature at which films are formed, plasticizers, defoamers, preservatives, surface-active substances for improving wetting, and pigments or soluble dyestuffs for coloration.

The penetrating capacity may be tested by different methods. The material to be submitted to such a test may be applied onto the chosen substrate e.g. by brushing, pouring or dropping. After drying, the penetrated material can be identified by inspection of a cross section. If dissolved resins are utilized, they may be colored by soluble dyestuffs. This method can produce unreliable results, however, with materials based on dispersions in the event that the aqueous phase is colored simultaneously. Since the aqueous phase of most of the dispersions penetrates deeper than the latex particles, the colored zone of the cross section does not necessarily evidence the actual penetration of the latex particles.

For proof of the better penetrating capacity according to the process of the invention copolymer dispersions containing optical brighteners were prepared by copolymerization with vinylsulfonyl-pyrazoline-brighteners at concentrations of from 0.01–0.05% (calculated on monomers), which contain in the latex particle the brightener molecules at random distribution all over the macromolecule as a structural unit of the polymer chain. Therefore, the optical brightener cannot be removed from the polymer by extraction. The polymer is located in the substrate at the spot where the optical brightener shows the characteristic fluorescence under UV radiation. The copolymer dispersions containing optical brighteners and having a finest particle size, were applied onto a number of substrates such as wooden plates, calcareous sandstone, plaster plates, plastering lime, plastering concrete, filler coating, unglazed clay plates, porous concrete, brick etc., the dry specimens were checked under UV radiation and the depth of their penetration measured on the planes of sections.

Besides the method of incorporating by polymerization fluorescent substances which enable an exact determination of the penetration depth of the polymer by UV radiation, different methods are also known. A suitable method, for example, consists in burning off with a Bunsen burner the plane of the section of primer-coated or impregnated substrate, the polymer being then distinguished by a grey discoloration. Planes of section of acid-resistant substrates may also be coated with concentrated sulfuric acid for identifying the penetration of the polymer. These experiments showed that the plastic dispersions of the invention having the same content of solid matter and finest-sized particles penetrate to the same depth and consolidate as well as known binders in solvent-containing penetrating primer coatings and that the penetrating depth combined with a good consolidating effect was much greater than these characteristics determined for dispersions with comparable polymer structure and average particle size diameters of more than 0.1 $\mu$m.

The superiority of the dispersions the particle size of which is within the range of <0.1 $\mu$m is made evident especially by the fact that at relatively high contents of solid matter that permit the application in a single processing step of a large quantity of plastics per unit of surface — e.g. at contents of solid matter ranging from 15 to 20 weight % — the dispersions with finest particle sizes penetrate almost completely into the substrate, where they contribute to consolidation and better anchorage of subsequently applied paints, whilst large portions of dispersions with coarser particle sizes do not penetrate into the substrate, but merely form a film on top of the surface.

A further test method offers the possibility of studying not only the penetrative depth, but also the consolidation effect obtainable by a certain quantity of binder, by causing the dispersions with finest particle sizes according to the invention to react with fine-grained, loose material. This method provides also the advantage that the material produces a compound of the grained material in the penetration zone after drying. The solidified core can be easily removed and weighed. Its weight is a reference for measuring the penetrative power and the consolidating effect of a dispersion. This test simulates — for example — the consolidation of surfaces of old, weather-beaten structures.

For carrying out the test, quartz powder is used (average analysis: 50% 40 $\mu$m) which was charged into shallow receptacles. On the spot where the material is to be submitted to the test, a hemispherical groove having a diameter of 2.5 cm was formed by pressing a correspondingly shaped stamp. 2 ml of the dispersion to be tested was dropped into this groove. After the described filling layer had been dried at room temperature for 4 hours, it was kept in a drying cabinet at 50° C for another 15 hours.

Table 1 sets forth the results of these tests.

By means of the process test were carried out on suitable plastics dispersions according to the invention, the particle size of which ranged from 0.02 to 0.1 $\mu$m and which were prepared according to the Examples 1 through 7.

As comparative material there were tested dispersions having a particle size D>0.1 $\mu$m, based on various monomer systems and commercially available polymers in organic solvents which are recommended for penetrative primer coatings.

The results of the tests show that the highest core weight and thus the best penetrative power combined with a good consolidating effect is obtained with the dispersions applied according to the invention and with the polymer solutions in organic solvents.

The results which are obtained with the aqueous plastics dispersions having larger average particle diameters (D>0.1 $\mu$m) are thoroughly and clearly inferior to those achieved with the dispersions with fine particle sizes applied according to the invention.

A further requirement to be fulfilled by the primer coatings with penetrative power consists of their capacity to guarantee good adhesion to paints subsequently applied onto the primer-coated substrate and of imparting to these subsequent paints a good anchorage to the substrate by means of the primer coating. This latter requirement has even to be met, when the subsequent paint is finally applied onto primer coating layers of unlevel thickness which may be due to irregular absorptive capacity of the substrate after multiple applications of the primer coatings.

This requirement was tested by applying dispersions with finest particle sizes (at approximately 12%) according to the invention three successive times, separated by intermediate drying steps, on asbestos cement plates as substrate. After drying in air for 3 days, this primer coat layer was painted with a dispersion paint containing as binder a styrene/butyl acrylate dispersion and pigmented at a ratio of dispersion to pigment filler mixture of 1:1.6. A cloth strip of polyethylene terephthalate was imbedded in the dispersion paint being still fresh, this cloth strip being painted once more with the same dispersion paint after drying of the first paint coat.

A good adhesion of the primer coating on the substrate and of the primer coating to the dispersion paint was exhibited upon trying to pull off the cloth strip, regardless of whether it was peeled off dry or wetted due to storage under water or dried again. Tests carried out according to Examples 1 through 7 with soft binder films adjustable by their monomer ratio or with rigid binder films of polymers, brought about the same results and conclusions. Without exception, the cloth strip could be pulled off the dispersion paint layer, while leaving the fabric structure embossed into the paint layer, in such a way that the paint was not peeled off from the substrate or from the primer coating. By cross-cutting the dried paint layer the same results were obtained, if the dispersed paint film was pulled off the cross-cutting squares by means of an adhesive tape stuck-on. The paint layer did not come off either.

The following Examples illustrate the preparation of dispersions with finest particle sizes suitable for the purpose of the invention:

EXAMPLE 1

A stable monomer emulsion was prepared from

| | |
|---|---|
| styrene | 134 parts by weight |
| butyl acrylate | 200 parts by weight |
| acrylamide | 4.5 parts by weight |
| methacrylic acid | 12.0 parts by weight |
| sodium salt of a secondary alkane-sulfonate ($C_{12}$-$C_{16}$) | 10 parts by weight |
| reaction product of nonyl-phenol with 10 – 12 moles of ethylene oxide | 5.0 parts by weight |
| water | 400 parts by weight |

The emulsion is metered into a liquor solution of 230 parts by weight of water, 2 parts by weight of non-ionic emulsifier and 8 parts by weight of ionic emulsifier. Simultaneously with the metering-in of the emulsion, a solution of 2 parts by weight of ammonium persulfate in 40 parts by weight of water was also metered in.

The average particle size of the dispersion which was adjusted to a pH of 8–9, was 0.036 82 m.

EXAMPLE 2

Copolymer dispersions containing an optical brightener and having finest-sized particles were obtained by dissolving in the monomer mixture according to Example 1 additionally 0.1 part by weight of vinyl-sulfonyl-pyrazoline-brightener (cf. German Offenlegungsschrift No. 2,011,552) and by subsequently preparing the plastics dispersions as described above.

Both the aqueous plastics dispersion and the dry polymer film showed a specific blue fluorescence under UV radiation which characteristic enabled the detection of even very small quantities of polymer in the various substrates. Fractionation by gel permeation chromatography proved that the optical brightener was incorporated uniformly in the polymer, i.e. no accumulations were formed in certain ranges of molecular weight. The average particle size of the copolymer dispersion containing an optical brightener was 0.038 μm.

EXAMPLE 3

A monomer mixture of

| | |
|---|---|
| styrene | 170 parts by weight |
| buty acrylate | 170 parts by weight |
| acrylamide | 4 parts by weight |
| methacrylic acid | 10 parts by weight | was metered into a liquor of 680 parts by weight of water, 25 parts by weight of a secondary sodium alkane sulfonate ($C_{12}$-$C_{16}$) and 10 parts by weight of a reaction product of nonyl phenol and from 8–12 moles of ethylene oxide.

A solution of 2 parts by weight of ammonium persulfate in 40 parts by weight of water was utilized as initiator. The average particle size diameter was 0.038 μm.

EXAMPLE 4

A stable monomer emulsion was prepared of

| | |
|---|---|
| styrene | 3600 parts by weight |
| butyl acrylate | 3600 parts by weight |
| acrylamide | 100 parts by weight |
| methacrylic acid | 250 parts by weight |
| sodium lauryl sulfate | 340 parts by weight |
| reaction product of nonyl-phenol with 8 – 12 moles of ethylene oxide | 180 parts by weight |
| water | 10000 parts by weight |

The emulsion was metered into a liquor solution of 5000 parts by weight of water, 80 parts by weight of the non-ionic emulsifier and 280 parts by weight of the anionic emulsifier. During addition of to the monomer emulsion a solution of 40 parts by weight of ammonium persulfate in 900 parts by weight of water was also metered in. The average particle size diameter of the dispersion, being adjusted to a pH of 8–9, was 0.042 μm.

The dispersion could be concentrated in the same reaction vessel under water jet vacuum up to a content of solid matter of about 45%. The average particle size remained 0.042 μm.

EXAMPLE 5

A monomer mixture of

| | |
|---|---|
| methyl methacrylate | 130 parts by weight |
| butyl acrylate | 200 parts by weight |
| acrylic acid | 12 parts by weight |
| acrylamide | 4 parts by weight | was metered into a liquor of 660 parts by weight of water, 20 parts by weight of sodium lauryl ethoxylate-sulfate (with 2–5 moles of ethylene oxide) and 8 parts by weight of a reaction product of nonyl phenol and 6–10 moles of ethylene oxide. A solution of 3 parts by weight of potassium persulfate in 30 parts by weight of water was utilized as initiator. The average particle size was 0.041 μm.

EXAMPLE 6

The components of the liquor were the same as specified in Example 5.

The monomer mixture was composed of

| | |
|---|---|
| methylmethacrylate | 100 parts by weight |
| butylacrylate | 230 parts by weight |
| acrylic acid | 13 parts by weight |
| acrylamide | 5 parts by weight |

2 parts by weight of potassium persulfate dissolved in 20 parts by weight of water were employed as initiator. The average particle size diameter was 0.045 μm.

EXAMPLE 7

A stable monomer emulsion was prepared from

| | |
|---|---|
| styrene | 180 parts by weight |
| butylacrylate | 180 parts by weight |
| acrylamide | 4 parts by weight |
| methacrylic acid | 10 parts by weight |
| sodium salt of a sulfuric acid ester of an ethoxylated alkyl- | |

| | |
|---|---|
| phenol reaction product of nonyl-phenol with 8 – 10 moles of ethylene oxide | 20 parts by weight |
| | 3 parts by weight |
| water | 400 parts by weight |

The emulsion was metered into a liquor solution composed of 200 parts by weight of water, 2 parts by weight of the non-ionic emulsifier and 1 part by weight of the anionic emulsifier. During addition of the emulsion, a solution composed of 2 parts by weight of ammonium persulfate in 30 parts by weight of water was also metered in.

The average particle size of the dispersion, adjusted to pH 8-9, was 0.080 μm.

COMPARATIVE EXAMPLE A

A copolymer dispersion was prepared composed of

| | |
|---|---|
| vinyl acetate | 70 parts by weight |
| vinyl ester of a branched carboxylic acid having 10 carbon atoms | 25 parts by weight |
| crotonic acid | 5 parts by weight | with an anionic emulsifier and an inorganic per-compound and containing from 40–50% of solid matter.

The average particle size was 0.620 μm.

COMPARATIVE EXAMPLE B

A copolymer dispersion was prepared, composed of

| | |
|---|---|
| vinyl acetate | 70 parts by weight |
| butylacrylate | 30 parts by weight | according to the specifications of Example A.

The average particle size was 0.270 μm.

COMPARATIVE EXAMPLE C

A copolymer dispersion was prepared, composed of

| | |
|---|---|
| styrene | 50 parts by weight |
| butylacrylate | 50 parts by weight |
| acrylic acid | 2 parts by weight |
| methacrylic acid | 5 parts by weight |
| acrylamide | 3 parts by weight | with a mixture of anionic and non-ionic emulsifiers and an inorganic per-compound.

The average particle size was 0.150 μm.

COMPARATIVE EXAMPLE D

A copolymer composed of

| | |
|---|---|
| vinyl acetate | 70 parts by weight |
| maleic acid dibutyl ester | 30 parts by weight | was dissolved in ethyl acetate to yield a 60% solution. The viscosity at 20° C according to Höppler (DIN 53 015) amounted to 80 P. A primer coating with penetrative effect was prepared from this solution in the following manner:

| | |
|---|---|
| 60% copolymer solution in ethyl acetate | 28 parts by weight |
| Shellsol A$^{(R)}$ | 62 parts by weight |
| ethyl glycol acetate | 10 parts by weight |

COMPARATIVE EXAMPLE E

From a copolymer composed of

| | |
|---|---|
| vinyl toluene | 85 parts by weight |
| acrylic acid-2-ethyl-hexyl ester | 15 parts by weight | having a viscosity of about 60 cP at 20° C according to Höppler in a 30% solution in xylene, a primer coating solution was prepared in the following manner:

| | |
|---|---|
| copolymer | 170 parts by weight |
| white spirit | 545 parts by weight |
| Shellsol A$^{(R)}$ | 285 parts by weight |

TABLE 1

Penetration experiments in quartz sand fillings

| Example | Average particle size (μm) (according to light scattering method) | core weight (g) after application of 2 ml of a 17% and 11% dispersion | |
|---|---|---|---|
| 1 | 0.036 | 12.3 | 13.6 |
| 2 | 0.038 | 11.8 | 12.5 |
| 3 | 0.038 | 12.1 | 12.8 |
| 4 | 0.042 | 10.5 | 11.9 |
| 5 | 0.041 | 11.3 | 11.9 |
| 6 | 0.045 | 11.1 | 11.5 |
| 7 | 0.080 | 8.1 | 9.8 |
| Comparative Examples | | | |
| A | 0.620 | 0.6 | 1.1 |
| B | 0.270 | 3.4 | 3.8 |
| C | 0.150 | 6.0 | 6.4 |
| D | — | 10.8 | 11.0 |
| E | — | 10.4 | 11.2 |

It is evident that in the compositions of Examples 1 through 7 of the above Table the average particle size varied from 0.036 to 0.080 microns.

What is claimed is:

1. A process for impregnating and primer coating absorptive substrates with a film-forming polymer which comprises applying to said substrate an aqueous plastics dispersion comprising about 5 to about 25% by weight of solid matter, the polymer particles of which have an average size of about 0.036 to 0.080 microns.

* * * * *